(No Model.) 7 Sheets—Sheet 1.

A. B. FOWLER & G. E. WARREN.
HEEL TRIMMING MACHINE.

No. 503,475. Patented Aug. 15, 1893.

Witnesses
Karl A. Andrén
Helen S. Andrén

Inventors.
Alfred B. Fowler,
and George E. Warren.
by Alban Andrén their atty.

(No Model.) 7 Sheets—Sheet 3.

A. B. FOWLER & G. E. WARREN.
HEEL TRIMMING MACHINE.

No. 503,475. Patented Aug. 15, 1893.

Witnesses
Karl A. Andrén
Helen S. Andrén

Inventors.
Alfred B. Fowler,
and George E. Warren.
by Alban Andrén, their atty.

(No Model.) 7 Sheets—Sheet 5.

A. B. FOWLER & G. E. WARREN.
HEEL TRIMMING MACHINE.

No. 503,475. Patented Aug. 15, 1893.

Witnesses
Karl A. Andrén
Helen S. Andrén

Inventors
Alfred B. Fowler & George E. Warren
by Alban Andrén their atty.

(No Model.) 7 Sheets—Sheet 6.
A. B. FOWLER & G. E. WARREN.
HEEL TRIMMING MACHINE.
No. 503,475. Patented Aug. 15, 1893.
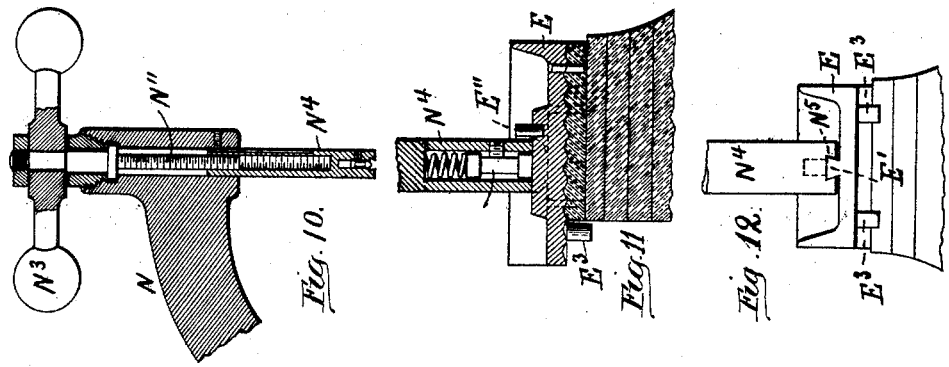
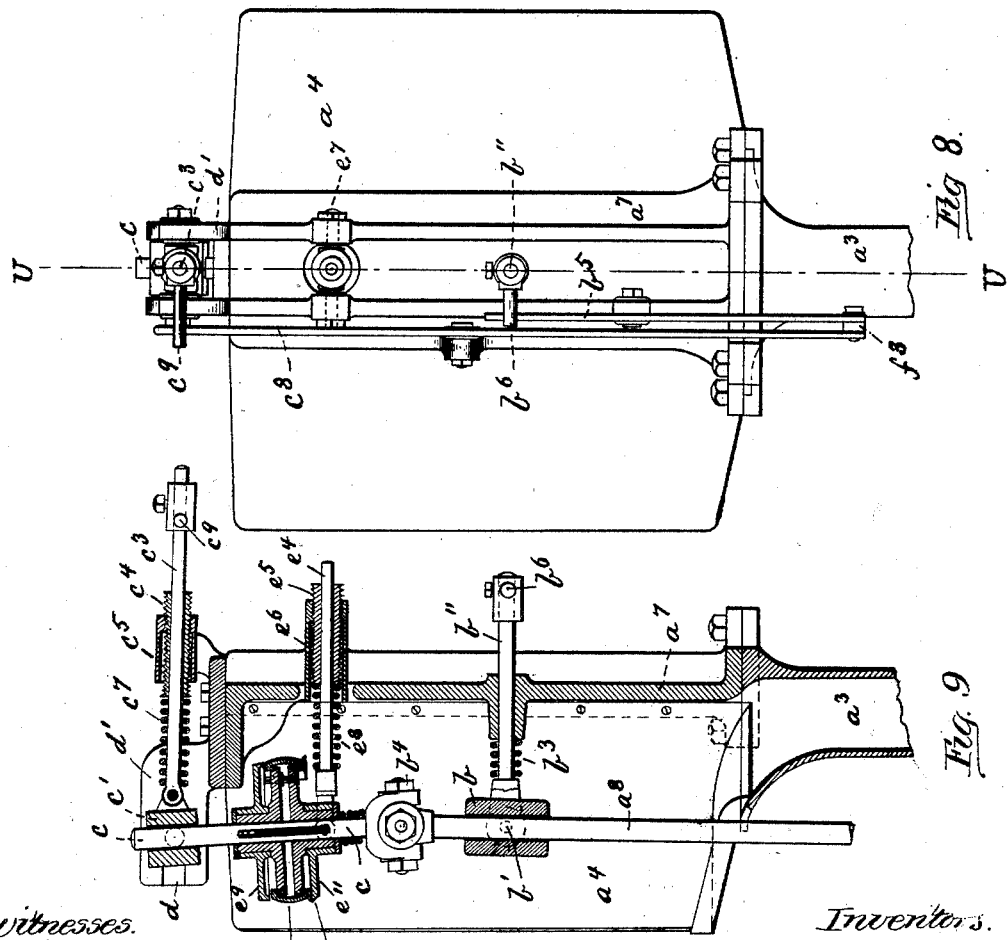

(No Model.) 7 Sheets—Sheet 7.

A. B. FOWLER & G. E. WARREN.
HEEL TRIMMING MACHINE.

No. 503,475. Patented Aug. 15, 1893.

Witnesses:
Karl A. Andrén
Helen S. Andrén

Inventors.
Alfred B. Fowler,
and George E. Warren,
by Alban Andrén, their atty.

UNITED STATES PATENT OFFICE.

ALFRED B. FOWLER AND GEORGE E. WARREN, OF EXETER, NEW HAMPSHIRE.

HEEL-TRIMMING MACHINE.

SPECIFICATION forming part of Letters Patent No. 503,475, dated August 15, 1893.

Application filed May 11, 1891. Renewed May 19, 1893. Serial No. 474,834. (No model.)

*To all whom it may concern:*

Be it known that we, ALFRED B. FOWLER and GEORGE E. WARREN, citizens of the United States, and residents of Exeter, in the county of Rockingham and State of New Hampshire, have jointly invented new and useful Improvements in Heel Trimming and Randing Machines, of which the following, taken in connection with the accompanying drawings, is a specification.

This invention relates to improvements in heel-trimming and randing machines, and it is carried out as follows, reference being had to the accompanying drawings, wherein—

Figure 1:
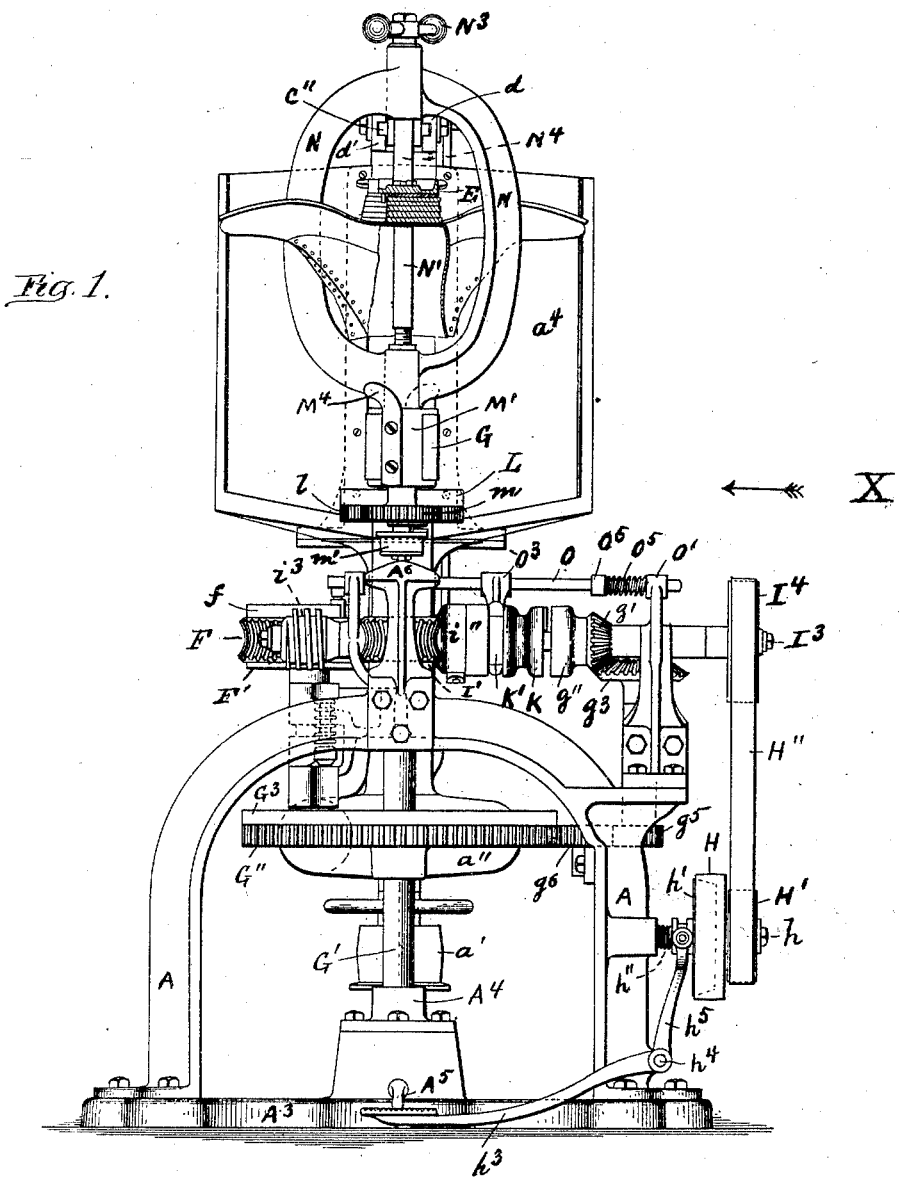
Figure 2:
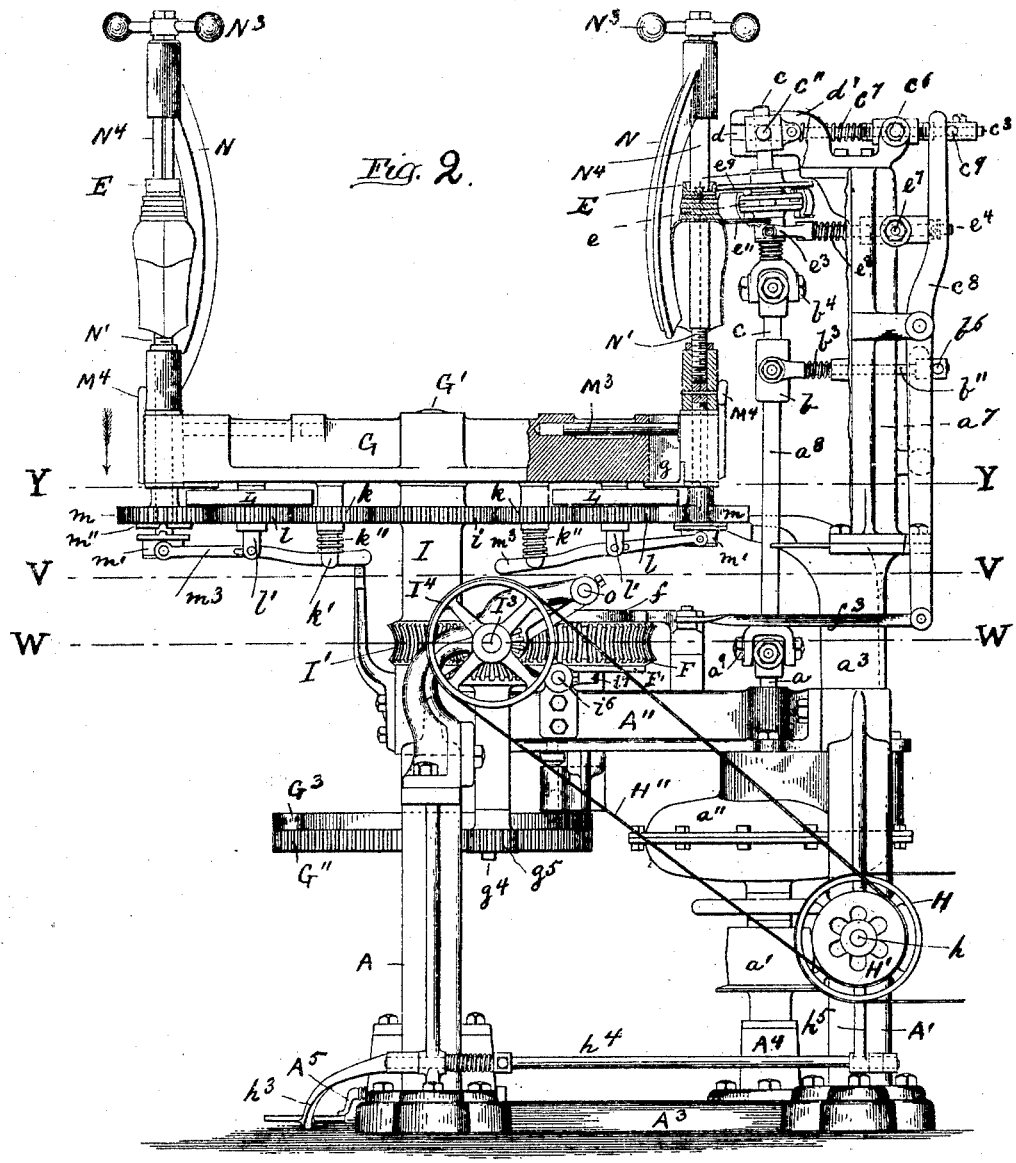
Figure 3:
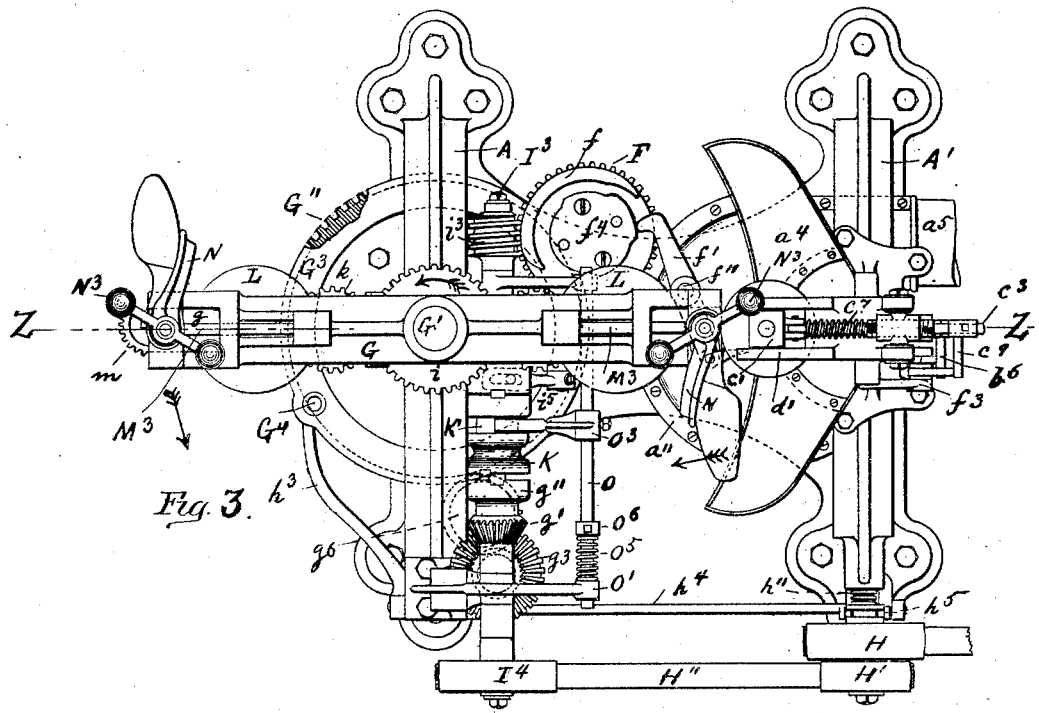
Figure 4:
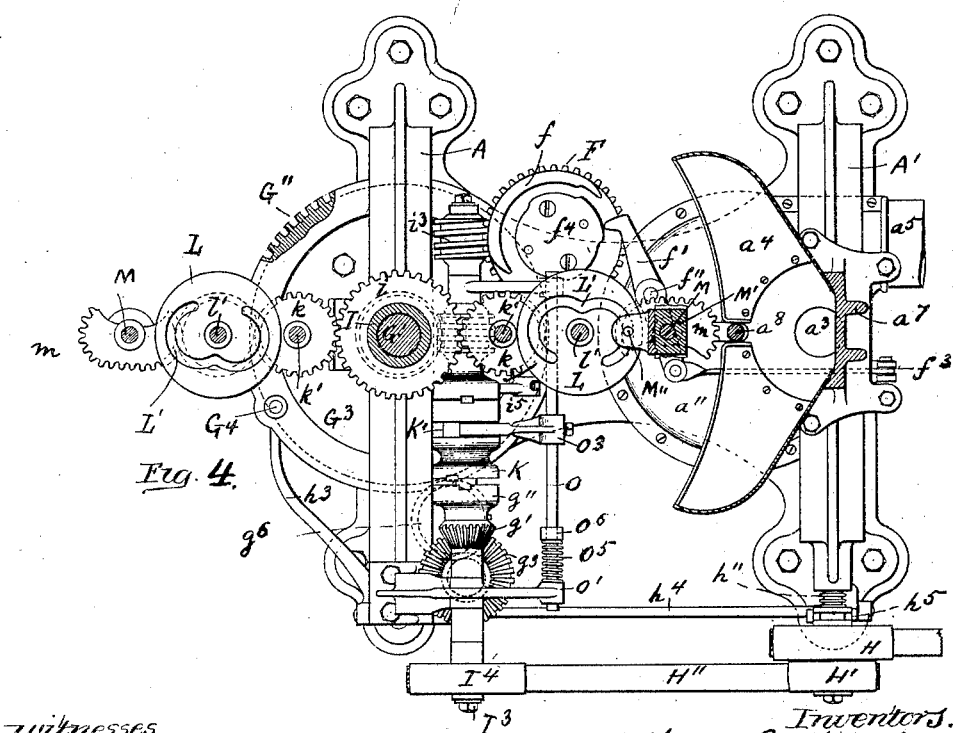
Figure 5:
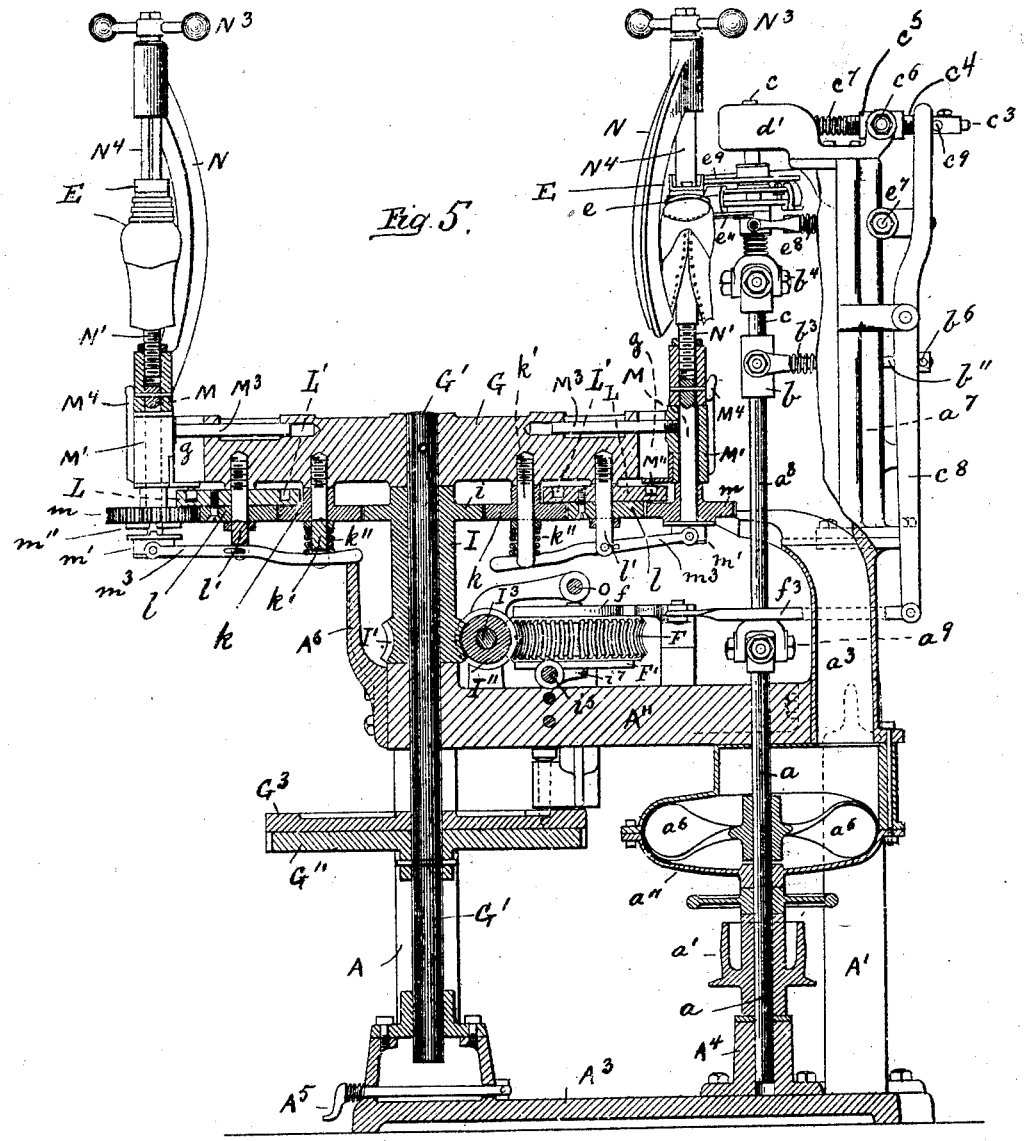
Figure 6:
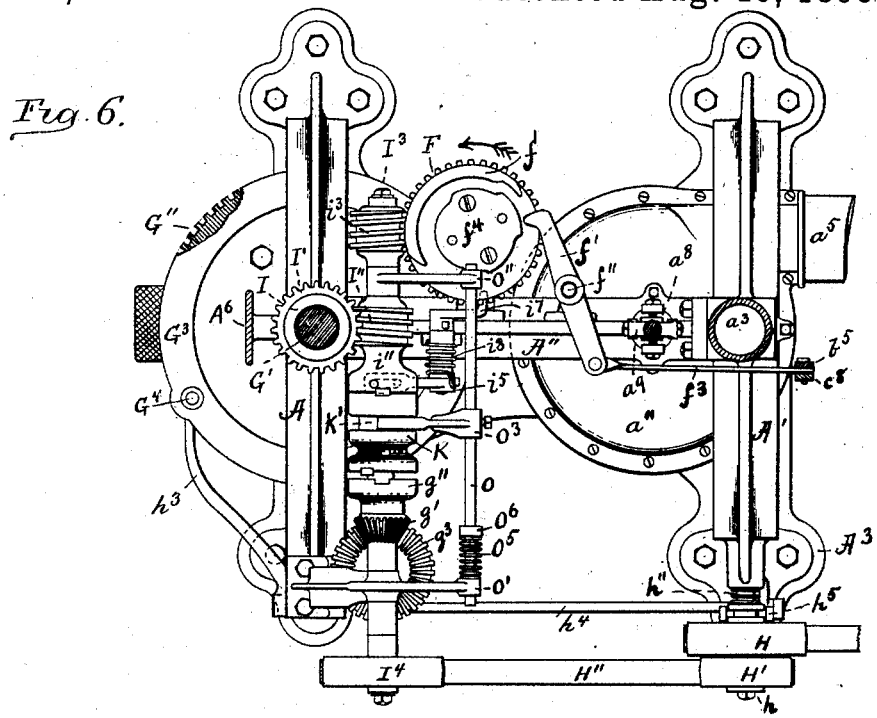
Figure 7:
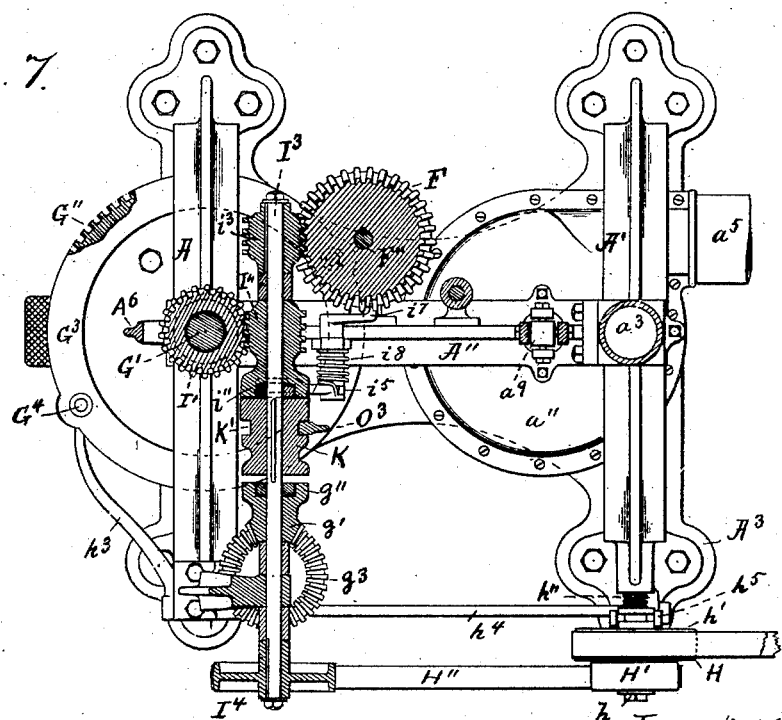
Figure 13:
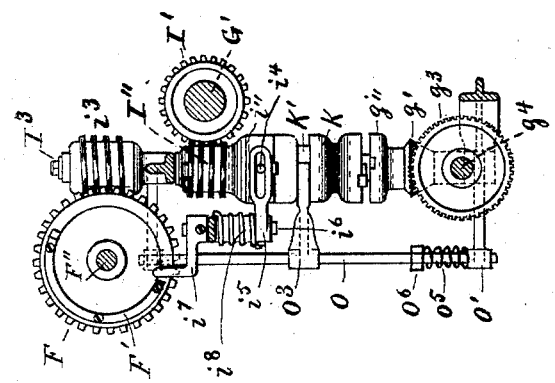
Figure 14:
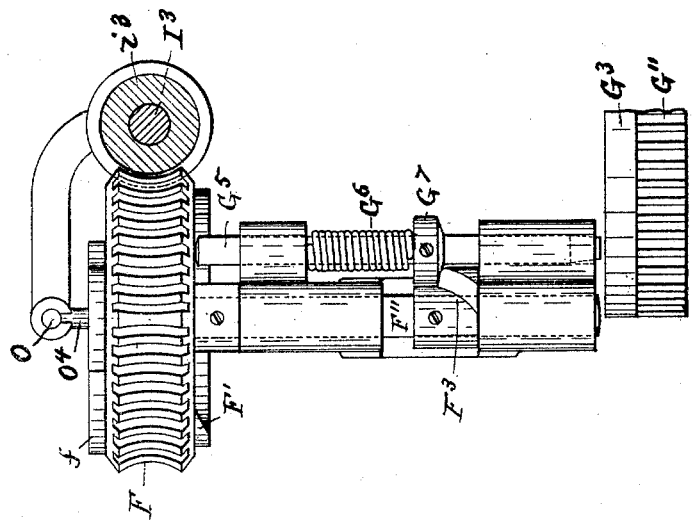

Figure 1 represents a front elevation of the machine. Fig. 2 represents a side elevation and partial section of the same as seen from X in Fig. 1. Fig. 3 represents a plan view of the machine. Fig. 4 represents a horizontal section on the line Y—Y shown in Fig. 2. Fig. 5 represents a central longitudinal section on the line Z—Z shown in Fig. 3. Fig. 6 represents a section on the line V—V shown in Fig. 2. Fig. 7 represents a section on the line W—W also shown in Fig. 2. Fig. 8 represents a detail rear view of the upper part of the machine. Fig. 9 represents a vertical section on the line U—U shown in Fig. 8. Fig. 10 represents a detail sectional view of the shoe clamp. Fig. 11 represents a detail sectional view of the heel and heel templet. Fig. 12 represents an end elevation of said heel and templet. Fig. 13 represents a detail bottom view of the stop mechanism for automatically stopping and holding the shoe holder; and Fig. 14 represents a detail side elevation of the automatic locking and unlocking mechanism for the jack.

Similar letters refer to similar parts wherever they occur on the different parts of the drawings.

A, A' is the frame or base parts of the machine preferably secured at a proper distance apart in their upper ends by means of a horizontal brace A'', and having their lower ends suitably secured to a base plate $A^3$. To said base plate is secured a step or bearing $A^4$ in which is journaled the vertical drive shaft $a$ which has its upper end journaled preferably in a bearing in the brace A'' or other stationary part of the machine as shown in Fig. 5. The shaft $a$ is set in a quick rotary motion by means of belt power applied to its pulley $a'$. The shaft $a$ passes upwardly through the blower $a''$, having a suction pipe $a^3$ terminating in its upper end as a hood $a^4$.

$a^5$ is the delivery pipe from the blower $a''$ as usual.

$a^6$ is the fan secured to the shaft $a$ within the blower $a''$, as is common in air forcing apparatus.

$a^7$ is a vertical post or standard secured in a suitable manner to the suction pipe $a^3$ or other stationary part of the machine.

$a^8$ is a secondary or intermediate shaft which is universally jointed at $a^9$ to the blower shaft $a$ as shown in Figs. 2 and 5. The upper end of the shaft $a^8$ is journaled in a bearing $b$ which is pivoted at $b'$ to a longitudinally adjustable spindle or rod $b''$, adapted to slide in a bearing in the standard $a^7$ as shown in Fig. 9.

$b^3$ is a spring on the spindle $b''$ for the purpose of automatically holding the trimming tool with a yielding pressure against the heel of the boot or shoe during the trimming operation. The upper end of the shaft $a^8$ is universally jointed at $b^4$ to the cutter carrying shaft $c$, the upper end of which is journaled in a bearing $c'$, having side trunnions $c''$, $c''$ adapted to rock and slide forward and back in grooved guides $d$, $d$ in a bracket $d'$ secured to the standard $a^7$ as shown in Figs. 1, 2, 3, 5, and 9. To the bearing $c'$ is pivoted a rod or spindle $c^3$ adapted to yield longitudinally in sleeve $c^4$, which latter is longitudinally adjustable within a sleeve or bearing $c^5$, pivoted at $c^6$ to the bracket $d'$.

$c^7$ is a spring interposed between the forward end of the adjustable sleeve $c^4$ and the bearing $c'$ for the purpose of automatically holding the cutter or trimmer tool with a yielding pressure against the contour of the heel to be trimmed. The sleeve $c^4$ is preferably externally screw-threaded and adapted to be adjusted in female screw thread on the interior of the pivoted bearing $c^5$ for the purpose of regulating the tension of the spring $c^7$ by which the rotary trimmer tool is held against the heel to be acted upon. On the shaft $c$ is splined and longitudinally adjustable the trimmer tool $e$ preferably provided with a rand or welt cutting edge $e'$.

$e''$ is a rand guide which is preferably made in the form of a non-rotary projection journaled on the hub of the cutter $e$ or on the cutter shaft, which rand guide is adapted to enter the rand groove on the shoe, and is longitudinally adjustable with the cutter, so as to prevent the shoe upper from being damaged by contact with the latter. The said rand guide may to equal advantage be made in the form of a loosely rotating disk journaled on the cutter or its shaft, if so desired. The said rand guide is pivoted at $e^3$ to a rod or spindle $e^4$ longitudinally adjustable in a sleeve $e^5$ preferably made externally screw threaded, and made adjustable within an internally screw threaded sleeve $e^6$, which is hung or pivoted at $e^7$ to the standard $a^7$ as shown in Figs. 2 and 9.

$e^8$ is a spring interposed between the forward end of the adjustable sleeve $e^5$ and the enlarged or shouldered forward end of the spindle $e^4$ for the purpose of causing the cutter tool to conform automatically to the contour of the heel that is being trimmed. By means of the sleeve $e^5$ the tension on the spring $e^8$ may be adjusted according to the pressure desired on the cutter against the heel.

Above the cutter $e$ is loosely journaled on its hub or shaft, a circular disk or idler $e^9$ which is automatically brought to bear against a top lift templet to be more fully described. The springs $c^7$, $e^8$, and $b^3$ or one or more, serve the purpose of holding said idler $e^9$ against said top lift templet by which arrangement the rotary cutter is held with a proper pressure against the heel during the operation of trimming the same. The cutter shaft and its intermediate shaft are automatically withdrawn so as to release the cutter from contact with the heel at the completion of the operation of trimming the heel, and to hold it in such a released position until a new heel is swung into position ready to be trimmed, which is accomplished by a continuously rotating cam $f$ acting on a lever $f'$ pivoted at $f''$, and having a link $f^3$ connected to it and to the lower ends of the vibratory levers $b^5$ and $c^8$ pivoted to the standard $a^7$ and adapted to be brought in contact respectively with adjustable projections $b^6$ and $c^9$ on the respective spindles $b''$ and $c^3$, as shown in Figs. 2, 4, 5, 6 and 9.

G is the jack frame secured to the upper end of an intermittently rotating shaft $G'$ journaled in bearings in the frame of the machine. The jack frame is intermittently rotated by means of a spur gear $G''$, secured to the shaft $G'$ and intermediate connecting mechanism from the driving pulley H, as will hereinafter be more fully shown and described. To said gear is secured a disk $G^3$ having two diametrically opposite locking recesses $G^4$ adapted to receive a locking pin $G^5$ actuated by a cam $F^3$ on the continuously rotated shaft $F''$ and a spring $G^6$ acting on a collar $G^7$ secured to the rod $G^5$ for the purpose of holding the jack frame stationary while a heel is being trimmed, and automatically releasing it when finished. On the jack frame spindle $G'$ is loosely journaled a sleeve I provided with a worm wheel $I'$, meshing in the teeth of a worm $I''$, loose on a worm shaft $I^3$, which latter is continuously rotated from the driving pulley H and the pulley $H'$ by the medium of a belt $H''$ leading from the latter to a pulley $I^4$ secured to the worm shaft $I^3$. The driving pulley H is preferably loosely journaled on the driving shaft $h$ and the pulley $H'$ is made fast thereon.

$h'$ is a friction clutch which is splined on the shaft $h$ and normally connected to the pulley H by the influence of a spring $h''$ during the operation of the machine. If it is desired to stop the machine, a treadle lever $h^3$ is depressed and locked beneath a projection $A^5$ on the base $A^3$, which treadle lever is attached to a shaft $h^4$ journaled in stationary bearings on the frame of the machine, said shaft having secured to it, a lever $h^5$ jointed at its upper end to a collar on the clutch $h'$ as shown in Fig. 1. When the treadle lever $h^3$ is released from the projection $A^5$, the clutch $h'$ is forced in contact with the interior of the driving pulley H by the influence of the spring $h''$ above mentioned.

We do not wish to confine ourselves to any particular device for starting and stopping the machine, as this may be accomplished by any of the well known treadle and clutch mechanisms without departing from the essence of our invention.

To the sleeve I is attached a spur gear $i$, the teeth of which mesh into the teeth of the intermediate gears $k$, $k$, loosely journaled on spindles $k'$, $k'$ secured to the under side of the jack frame G as shown in Figs. 2, 4 and 5. Each loose gear $k$ meshes into the teeth of another loose gear $l$ journaled on a pin $l'$, also secured to the under side of the said jack frame, and each such gear $l$ meshes into the teeth of an irregular gear $m$ loosely journaled one on each of the shoe holder shafts M, M, as shown in said Figs. 2, 4 and 5. Each of the shoe holder shafts M is journaled in a bearing $M'$, which is radially adjustable in a slot $g$ in the jack frame G for the purpose of properly presenting the heel to the action of the cutter with a minimum movement of the cutter shaft. Such radial adjustment of the shoe holder shaft is automatically accomplished by means of a grooved cam L secured to the intermediate gear $l$, which cam has a groove $L'$ adapted to receive a pin or pin and roll $M''$ connected in a suitable manner to the bearing $M'$ as shown in Figs. 2, 4 and 5. To each of the radially adjustable bearings $M'$ is attached a horizontal pin $M^3$ adapted to slide in a bearing in the jack frame M for the purpose of steadying the said bearings $M'$, $M'$, as they are moved radially relative to the jack frame, as shown in Figs. 2, 3 and 5. The object of the irregular gears $m$, $m$, on the shoe holder shafts M, M, is to cause an oscillating motion to be imparted to the shoe holder shafts with freedom of radial adjustment relative to the jack frame for the purpose of properly presenting the heel to the action of the cutter. Upon the lower end of each shoe holder shaft M is splined and longitudinally adjustable thereon a clutch $m'$ adapted to interlock with a corresponding clutch $m''$ on the under side of the respective irregular loose gears $m$, $m$, as shown in Fig. 5. To each of said clutches $m'$ is pivotally connected a lever $m^3$ which is hung on the pin $l'$ and normally actuated by a spring $k''$ preferably arranged on the pin $k'$, for the purpose of holding the clutch $m'$ locked to the irregular gear $m$ as shown at the right side of Fig. 5, and thereby causing the shoe opposite to the trimmer tool to be turned from breast to breast of the heel during the trimming operation. The other clutch is automatically disengaged from its gear $m$ by its lever $m^3$ coming in contact with and resting on a stationary cam projection $A^6$ secured to the frame A or other stationary part of the machine as shown in the left side of Fig. 5 to allow of the removal of the trimmed shoe and its replacement by another.

N is the shoe holder having its lower portion secured in a suitable manner to the shoe holder shaft M.

$N'$ is the jack spindle, one for each of the shoe holders, which spindle is preferably screw threaded in its lower end, and adjustably secured to the lower hub of the shoe holder, so as to cause said jack spindle to be longitudinally adjustable relative to the trimmer tool, so as to bring the rand groove on the shoe in a position corresponding to that of the rand guide on the cutter.

During the operation of the machine, the shoe is supported upside down on the jack spindle $N'$, and clamped in position by means of a pressure screw spindle $N''$ journaled in a bearing in the upper part of the shoe holder N, and adapted to be turned by means of a handle or hand wheel $N^3$ secured to its upper end as shown in detail in Fig. 10.

$N^4$ is a vertically adjustable internally screw threaded sleeve in which the pressure screw $N''$ works; said sleeve $N^4$ is prevented from turning around its axis during its up and down movement, and it has in its lower end preferably a dove tailed groove $N^5$, adapted to receive a correspondingly shaped dove tailed projection $E'$ on the top of the heel templet E, as shown in Fig. 12.

$E''$ is a stop projection on top of the heel templet E adapted to be brought in contact with the side of the sleeve $N^4$ when the templet is brought in its proper position relative to said sleeve; and $E^3$, $E^3$, is a ledge or stop on the under side of the templet E against which the breast of the boot or shoe heel is held during the trimming operation as shown in Figs. 11 and 12. Each shoe holder bearing $M'$ has at its outer end a stop projection $M^4$ against which the lower part of the shoe holder is brought to bear when said shoe holder is swung into its proper position for presenting the heel to the action of the cutter; said projection thus serving as a stop to limit the rotary motion of the shoe holder, as well as a means for holding the shoe holder shaft clutch $m'$ in a proper position so that it may be engaged with the clutch on the irregular gear $m$ shortly after the spring pressed clutch lever $m^3$ is released from the stationary cam or projection $A^6$.

In the operation of the machine, the jack frame G is rotated while the sleeve I and its gears $I'$, $i$ are held stationary and vice versa, as will be hereinafter more fully described.

The mechanism for intermittently rotating the jack frame G is constructed as follows: On the continuously rotating worm shaft $I^3$ is loosely journaled a bevel gear $g'$, having a clutch $g''$ adapted to be engaged with a sliding clutch K splined on the shaft $I^3$ as shown in Figs. 1, 3, 4, 6, 7 and 13; the teeth of the bevel gear $g'$ mesh in the teeth of a bevel gear $g^3$ secured to the upper end of the shaft $g^4$ journaled in a stationary bearing and having secured to its lower end a pinion $g^5$ which is geared to the gear $G''$ on the jack frame spindle $G'$ by means of an intermediate gear $g^6$ shown in Fig. 1 and in dotted lines in Figs. 3 and 4. It will thus be seen that a rotary motion is imparted to the jack frame from the worm shaft $I^3$ by locking the clutches K and $g''$ together, and when the clutch K is disconnected from the clutch $g''$ the jack frame remains stationary. The worm $I''$ meshing in the teeth of the worm wheel $I'$ is also loose on the worm shaft $I^3$ and said worm has in one of its ends a clutch $i''$ adapted to engage with the sliding clutch K on the shaft $I^3$ as shown in Figs. 6, 7 and 13. The worm $I''$ serves for the purpose of intermittently oscillating the shoe holders from breast to breast of the heel of the boot or shoe, which is accomplished by the sleeve I, and its gear $i$ meshing by means of the intermediate gears $k, l$, in the teeth of the irregular gears $m$, $m$, on the shoe holder shafts M, M. To the end of the worm shaft $I^3$ is secured a worm $i^3$ meshing in the teeth of the worm wheel F, which is secured to a shaft $F''$ journaled in stationary bearings on the frame of the machine. The said worm wheel F has on its top an outer cam $f$ for withdrawing the cutter from the heel and on its shaft $F''$ a cam $F^3$ for actuating the locking pin $G^5$ by which the disk $G^3$ and its gear $G''$ are held stationary during a portion of the rotation of said gear F, as herein above described. In addition to the cam $f$, the gear F has also arranged on its top an inner cam $f^4$ for automatically shipping the clutch K for engagement with the respective clutches $g''$ and $i''$, there being for this purpose arranged a shipper bar O adapted to slide in stationary bearings $O'$ and $O''$, and having secured to it an arm or projection $O^3$ adapted to enter an annular groove $K'$ in the longitudinally movable clutch K. The shipper rod O is moved in one direction by means of the cam $f^4$ acting on a pin or projection $O^4$ on the said shipper rod, and in the opposite direction preferably by means of a spring $O^5$ located on the rod O between a collar $O^6$ on said rod and the stationary bearing $O'$ as shown in Figs. 1, 3, 4, 6 and 13.

On the under side of the worm wheel F is arranged a face cam $F'$ which actuates a lever $i^7$ attached to a shaft $i^6$ located in a stationary bearing on the machine frame, such shaft having also attached to it, a slotted lever $i^5$ through the slot of which passes a pin or projection $i^4$ attached to the clutch $i''$ as shown in Fig. 13; the levers $i^7$ and $i^5$ are actuated in one direction by the said cam $F'$ and the opposite direction by a spring $i^8$ on the shaft $i^6$. The object of this device is for the purpose of holding the clutch $i''$ and its worm $I''$ stationary while cutter is not acting upon the heel of the boot or shoe.

The operation of the machine is as follows: After the shoe has been properly secured to the shoe holder and the machine set in motion, the jack frame rotates half a revolution carrying the shoe to the cutter after which the said jack frame is temporarily locked in position. The cutter is automatically brought in contact with the heel and automatically adjusted thereto; the shoe holder turning mechanism is then automatically set in motion causing the heel of the shoe to be turned from breast to breast in contact with the cutter; while this takes place an untrimmed heel and its shoe is being adjusted and secured to the opposite shoe holder. After the heel has been trimmed, the shoe holder turning mechanism is automatically stopped and locked, the cutter is automatically withdrawn from contact with the heel, the jack frame is automatically released and swung half a revolution around its axis bringing the finished heel in front of the operator and the untrimmed heel brought into position to be acted upon by the cutter and so on.

Having thus fully described the nature, construction, and operation of our invention, we wish to secure by Letters Patent and claim—

1. In a heel machine, the combination with a boot or shoe holder, of a vertical rotary drive shaft, a secondary shaft universally jointed to the drive shaft and rising vertically therefrom, a rotary trimmer connected with and rotated by the secondary shaft, a pivoted vibratory lever having a spring yielding connection with the secondary shaft, a horizontally rotating cam, and a horizontally swinging lever acted on by the cam and having a link connection with the vibratory lever for automatically vibrating the latter at intervals to swing the secondary shaft and thereby withdraw the rotary trimmer from contact with the boot or shoe, substantially as described.

2. The combination with a shoe holder, of a vertical rotary drive shaft, a secondary shaft universally jointed to the drive shaft and rising vertically therefrom, a rotary trimmer connected with and rotated by the secondary shaft, a pivoted vibratory lever connected with the secondary shaft for swinging the same laterally, a horizontally rotating cam, and a horizontally swinging lever acted on by the cam and having a link connection with the vibratory lever for operating the latter at intervals to automatically swing the secondary shaft and thereby withdraw the rotary trimmer from contact with the boot or shoe, substantially as described.

3. The combination with a boot or shoe holder, of a rotary drive shaft, a secondary shaft universally jointed to the drive shaft, a cutter shaft universally jointed to the secondary shaft and provided with a longitudinally sliding cutter splined thereon, a pair of vibratory levers having independent spring connections with the secondary shaft and cutter shaft, and means for automatically vibrating the levers at intervals to automatically swing the secondary shaft and the cutter carrying shaft for withdrawing the rotary cutter from contact with the boot or shoe, substantially as described.

4. The combination with a boot or shoe holder, of a rotary drive shaft, a secondary shaft universally jointed to the drive shaft, a cutter shaft jointed to the secondary shaft and provided with a trimming cutter rotating therewith, a pair of vibratory levers having independent spring yielding connections with the secondary shaft and the cutter shaft, a rotating cam, and a lever operated by the cam and connected with the pair of vibratory levers for operating them to automatically swing the secondary shaft and the cutter shaft and thereby withdraw the rotary cutter from the boot or shoe, substantially as described.

5. The combination with an intermittently rotating jack frame having a series of oscillatory boot or shoe holders, of a rotary drive shaft, a secondary shaft universally jointed to the drive shaft, a rotary trimming knife connected with and rotated by the secondary shaft, a vibratory lever having spring yielding connections with the secondary shaft, a rotating cam, and a swinging lever acted on by the cam and having a link connection with the vibratory lever for automatically vibrating the latter at intervals to swing the secondary shaft and thereby withdraw the rotary cutter from contact with the boot or shoe, substantially as described.

6. The combination with an intermittently rotating jack frame, radially movable bearings thereon, oscillatory shoe holder shafts carrying shoe holders and supported by the radially movable bearings, and means for radially adjusting the bearings and oscillating the shoe holder shafts as the jack frame rotates, of an upright drive shaft, a secondary shaft forming a vertical continuation of the drive shaft and universally jointed thereto, a rotary trimming cutter connected with and rotated by the secondary shaft, a vibratory lever having spring yielding connections with the secondary shaft, a horizontally rotating cam, and a horizontally swinging lever having a link connection with the vibratory lever for automatically vibrating the latter at intervals to automatically swing the secondary shaft and thereby withdraw the rotary cutter from contact with the boots or shoes, substantially as described.

7. The combination with an intermittently rotating jack frame provided with radially movable and oscillatory shoe holders, of an upright rotary drive shaft, a secondary shaft universally jointed to the drive shaft, a cutter shaft universally jointed to the secondary shaft and provided with a trimming cutter rotating therewith, vibratory levers having spring yielding connections with the secondary shaft and cutter shaft, and means for automatically vibrating the levers at intervals to swing the secondary shaft and cutter shaft and thereby withdraw the rotary cutter from contact with the boots or shoes, substantially as described.

8. The combination with a rotary drive shaft, a secondary shaft universally jointed to the drive shaft, a rotary trimming cutter connected with and rotated by the secondary shaft, and means for automatically swinging the secondary shaft to move the rotary cutter into and out of contact with a boot or shoe, of an intermittently rotating jack frame, radially movable bearings on the jack frame, oscillatory shoe holder shafts provided with irregular gears, cams engaging the movable bearings and provided with gears meshing into the irregular gears, and means for transmitting rotary motion to the gears of the cams, substantially as described.

9. The combination with a longitudinally and laterally yielding rotary trimmer, of a jack spindle G' provided with a sleeve I having a gear $i$, means for rotating the sleeve on the jack spindle, a jack frame G secured to the jack spindle and provided with radially movable bearings M', oscillatory shoe holder shafts M journaled in the bearings and provided with irregular gears $m$, cams L engaging the bearings and provided with gears $l$, and gears $k$ transmitting motion from the sleeve on the jack spindle to the gears of the cams, substantially as described.

10. The combination with a longitudinally and laterally yielding trimmer, of a jack spindle, a sleeve mounted on the jack spindle, a jack frame secured to the jack spindle and provided with radially movable bearings, oscillatory shoe holder shafts carried by the bearings and provided with irregular gears, independent cams each provided with a gear meshing into one of the irregular gears and operated by a gear connection with the sleeve, and means for turning the sleeve, substantially as described.

11. The combination with a longitudinally and laterally yielding trimmer, of a jack spindle, a sleeve journaled on the spindle and provided with a gear, a jack frame secured to the spindle and provided with a series of radially movable bearings, oscillatory shoe holder shafts carried by the bearings and provided with irregular gears, independent cams mounted on the jack frame and each provided with a gear meshing into one of the irregular gears, gears transmitting motion from the sleeve on the jack spindle to the gears on the cams, and worm mechanism for turning the sleeve on the jack spindle, substantially as described.

12. The combination with a yielding heel trimmer, of a jack spindle, a jack frame secured to the spindle and provided with radially movable bearings, oscillatory shoe holder shafts carried by the bearings and provided with irregular gears, independent cams mounted on the jack frame and each provided with a gear, a sleeve mounted on the jack spindle and geared to the gears of the cams, a clutch acting in connection with each irregular gear, clutch levers for moving the clutches into and out of engagement with the irregular gears, and a cam for operating the clutch levers, substantially as described.

13. The combination with a boot or shoe support, of a heel clamping sleeve, and a heel templet having a sliding engagement with the sleeve and provided on its upper side with an attached stop projection to bear against the sleeve and on its lower side with a stop projection to bear against the heel breast, substantially as described.

14. The combination with a boot or shoe jack, of an upright drive shaft, a secondary shaft universally jointed to the drive shaft and constituting a vertical continuation thereof, a cutter shaft jointed to the secondary shaft, a trimmer splined on the cutter shaft to move longitudinally therealong but rotating therewith, lever mechanism for swinging the secondary shaft and cutter shaft laterally, and a horizontally rotating cam for automatically operating the lever mechanism, substantially as described.

In testimony whereof we have signed our names to this specification, in the presence of two subscribing witnesses, on this 30th day of April, A. D. 1891.

ALFRED B. FOWLER.
GEORGE E. WARREN.

Witnesses:
GEO. W. WESTON,
SUSIE SPRINGER.